June 10, 1958  H. A. WISTRICH  2,838,383
CONTACTING LIQUIDS BY RECIPROCAL DISPERSION
Filed Dec. 22, 1955

INVENTOR
HARRY A. WISTRICH
BY Oswald H. Milmore
HIS ATTORNEY

United States Patent Office 2,838,383
Patented June 10, 1958

2,838,383

CONTACTING LIQUIDS BY RECIPROCAL DISPERSION

Harry A. Wistrich, Walnut Creek, Calif., assignor to Shell Development Company, New York, N. Y., a corporation of Delaware Application December 22, 1955, Serial No. 554,658

12 Claims. (Cl. 23—310)

This invention relates to a method and apparatus for intimately contacting two or more liquids which form two liquid phases and have relatively different densities by countercurrent flow through a series of contacting stages or compartments within each of which a reciprocal or double dispersion is effected, i. e., wherein a layer of each of said liquids is maintained within each compartment and contact is achieved by alternately (a) dispersing the liquid of lower density from each stage below the uppermost as a multitude of small jets into the continuous body of liquid of greater density within the adjoining higher stage and (b) dispersing the liquid of greater density from each stage above the lowermost as a multitude of small jets into the continuous body of liquid of lower density within the adjoining lower stage. For convenience, the liquids of relatively lower and higher densities are herein called the light and heavy liquid, respectively.

An alternate phase dispersion column for carrying out the above-mentioned operations is described by Van Dijck in U. S. Patent No. 2,011,186. Alternate flow of the liquid phases through the orifices of the perforated plates is therein attained by the use of surge pumps connected to the ends of the column or by reciprocating the perforated plates vertically. Such arrangements for inducing alternate flow of the liquid phases is complicated.

A further difficulty encountered in such operations is a change in the relative volumes of the two liquid layers within the compartments defined by the perforated walls. For example, when one liquid is oil containing several components and the other is a selective solvent for one of such components, there occurs a transfer of a part or all of one or more of such components from the oil phase into the solvent phase, resulting in a decrease in the volume of the oil phase and an increase in the volume of the solvent phase. This change in relative volumes is progressive as the extraction proceeds and causes a gradual change in the interface level between the layers of liquids within each contacting compartment until the thickness of one of the layers is reduced to the point at which it no longer serves as an effective continuous phase into which the other liquid can be dispersed through the perforated plate to attain an effective contact and a significant transfer of solute or component. Undue reduction in the depth of one layer is also detrimental in that the layer becomes depleted soon after the liquid of that layer commences to be dispersed into the layer of the other liquid in the adjoining compartment. This difficulty is considered in greater detail in the U. S. patents of Maycock et al., Nos. 2,729,550 and 2,767,068, wherein there are disclosed certain remedial steps and apparatus for maintaining the liquid layers in the compartments at effective depths as well as other arrangements for causing alternate flow of the liquids in opposed directions, said other arrangements involving the intermittent admission of the liquids to the column.

It is the object of this invention to provide an improved method and apparatus for the countercurrent contacting of liquids according to the reciprocal dispersion principle wherein the means for inducing alternate flow of the liquid phases are simplified and the need for surge pumps, reciprocating plates or intermittent admission of the feed liquids is obviated.

A further object of the invention is to provide a simplified operating method and means for preventing the progressive shift in the interface level between the liquid layers within the compartments which leads to the undesired reduction in the depth of one or the other of the layers.

In summary, the apparatus according to the invention, in a specific preferred embodiment, consists essentially of a vertical column containing a number of dispersing devices, such as horizontal perforated trays, through which liquid can flow in either direction, said devices being mounted with suitable intervals so as to subdivide the column into a vertical series of compartments, each tray having a downcomer-riser conduit extending both above and below the tray to intermediate levels of the adjoining compartments, inlets and outlets at the end compartments, and means for controlling the rate of discharge of at least one of said liquids (and, hence, the inventory of that liquid within the column) in a cyclic manner such that the interfaces between the pairs of liquid layers in the several compartments alternately rise and fall through distances sufficient to immerse both ends of said conduits, first in one of said liquids and then in the other, thereby causing the upward dispersal of the lighter liquid up through the trays in alternation with flow of the downward dispersal of the heavier liquid down through said trays. Either the top or the bottom outlet may be controlled and the control element may be a valve which is connected across the full or partial discharging stream and is alternately open and either throttled or fully closed. The valve is preferably provided with a powered actuating device which operates automatically in response to the rise and fall of the interface within at least one of the several compartments which is provided with a level-sensing device, the actuating means being of the type which moves the valve toward its fully or partially closed position when the said interface attains one predetermined level and moves the valve toward its open position only after the said interface has shifted to a second predetermined level which differs from said first predetermined level by an appreciable distance, e. g., more than one-tenth of the height of the compartment, sufficient to bring about the above-mentioned immersion of both ends of the conduits alternately in two liquids.

The method of operation includes feeding the light liquid into the lowermost compartment and the heavy liquid into the uppermost compartment, both of which operations are preferably at steady flow rates, and maintaining within each compartment a layer of the heavy liquid above each dispersing tray and at the bottom of the column and a layer of the light liquid beneath each tray and at the top of the column, the thickness of each layer which adjoins a tray being variable and approximately the same as the height of the downcomer-riser conduit which extends above and below the tray, said thickness being large enough to force either liquid through the dispersing tray when the said conduit is filled with the other liquid. The level of the interface between the two layers is caused alternately to rise above the level of the bottom of the conduit leading to the next higher compartment and also above the level of the top of the conduit leading to the next lower compartment, and fall below these two levels, such that both ends of the conduits are alternately immersed first in the heavy liquid and then in the light liquid by recurrently changing the inventory of one liquid within the column (concomitantly with an opposite change in the inventory of the other liquid), with the result that the conduits are alternately filled with the heavy liquid and with the light liquid. This action causes each of the liquids to flow alternately through the dispersing tray or like dispersing device in its settling direction while the other liquid fills the conduit and, usually, flows through said conduit in the settling direction thereof. This change in the liquid inventory and the consequent rise and fall in the interface levels are brought about by recurrently increasing and decreasing the discharge rates of the liquids, the rate of one being increased while that of the other is increased, through control of one or both of the discharging streams, preferably in response to the position of the level within a selected one or more of the compartments, but if desired by some other element, such as cyclic timing device.

The method, in a broad aspect thereof, may be regarded as including a new and improved method of operating the apparatus disclosed in the U. S. patent to Grunewald et al., No. 2,647,856, which discloses a method wherein the liquids flow continuously in the same directions, only one liquid being dispersed, and discloses an apparatus differing from that according to this invention in that the mechanism for operating the discharge valve is not adapted for producing recurrent shifts in the interface levels for distances sufficient to immerse the two ends of the conduits alternately in the two liquids and thereby cause reversals in the flow directions of the liquids through the plates.

The invention will be further described with reference to the accompanying drawings forming a part of this specification and showing certain preferred embodiments, wherein.

Figure 1:
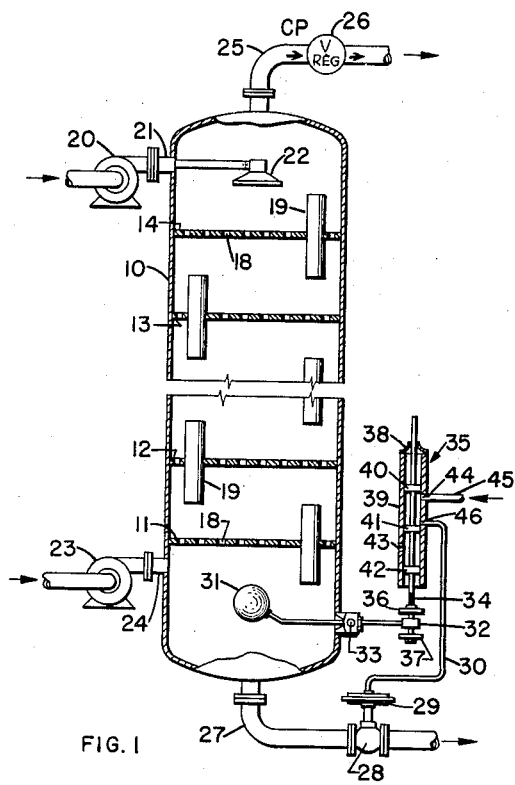
Figure 1 is a vertical sectional view through an extraction column constructed in accordance with the invention, parts being shown diagrammatically.

Referring to Figure 1 of the drawing, the extraction apparatus includes a vertical column 10 containing a plurality of horizontal partitions in the form of plates 11, 12, 13 and 14, having orificial openings 18 of suitable like size, e. g., of the order of about 0.05 to 0.25 inch in diameter, distributed over the plate and in sufficient number to produce the desired dispersion. Each plate has a downcomer-riser conduit 19, in the form of an unobstructed tube which is open at both ends and extends both above and below the plate to provide direct, free communication between intermediate levels of the adjacent compartments on opposite sides of the plate. These conduits are preferably located on opposite sides on adjacent plates. In the preferred construction shown each conduit 19 extends to about the mid-levels of the adjacent compartments, so that the open ends of the two tubes within the same compartments are at a common level; however, it is not essential that this be exactly so, and some lengthening of the tubes to produce a small overlap is desirable, as will appear, and some shortening to leave a vertical interval is permissible.

The liquid of relatively greater density to be contacted is admitted into the uppermost compartment, through a pump 20, inlet pipe 21 and downwardly directed distributor 22, and the liquid of relatively lower density to be contacted is admitted into the lowermost compartment through a pump 23 and inlet pipe 24. The latter liquid is, after flow through the column, discharged at the top through an outlet pipe 25. This pipe may, if desired, be connected to any suitable means for imposing a constant back-pressure, represented by a constant-pressure inlet valve 26. The liquid of greater density is discharged from the bottom of the column through an outlet pipe 27 having a flow control valve 28. In one embodiment this valve is of the type having a pneumatic actuating bellows 29 which is connected to the valve spindle to move the latter to the fully open position of the valve upon application of gas under pressure through a line 30 and permits the spindle to move the valve to the fully closed position (by the action of a spring, not shown) when the gas is vented. The closed position of this valve may be such that the flow of liquid is totally stopped, or it may be such that the flow of liquid is merely reduced, as will be explained further hereinafter.

The lowermost compartment contains a level-sensing device, represented by a ball float 31 adapted to float at the interface between layers of the two liquids and attached to a lever arm 32 which is pivotally connected to the column housing at a fulcrum 33 and extends outwardly from the column in sealed relation. The outer end of the lever is bifurcated and receives an actuating rod 34 of a balanced pneumatic valve 35. The rod is threaded and carries a pair of adjustable abutments 36 and 37 that are spaced apart to be alternately engaged by the arm 32 so as to provide lost motion. When there is insufficient friction on the rod to maintain it in whatever position it is given by the lever arm it is desirable to provide a friction spring 38. The pneumatic valve, which is shown diagrammatically, includes a housing 39 containing a bore within which are three pistons 40, 41 and 42, all fixed on the rod 34, being shown in their lowermost position in the drawing. The housing has a vent 43 which is always in communication with the space between the pistons 41 and 42 and a port 44 which is always in communication with the space between the pistons 40 and 41 and through which gas under pressure is admitted from a line 45. The line 30 is connected to a port 46 which communicates with the space immediately above the piston 41 when the latter is in the lower position shown and which communicates with the space immediately below the piston 41 when in the upper position. The abutment 36 is adjusted on the rod 34 to be engaged by the upper side of the arm 32 for raising the pistons, venting gas from the bellows 29 and line 30, and closing the valve 28 when the float 31 reaches a predetermined level at which the interface level is below the bottom of the lowermost tube 19. Similarly, the abutment 37 is adjusted to be engaged by the underside of the arm 32 for lowering the pistons to the positions shown and admitting pressure gas through the line 30 to the bellows 29 and opening the valve 28 when the float 31 reaches a predetermined level at which the interface level is above the bottom of the said tube 19. It is evident that the valve 28 will remain in one or the other of its extreme positions until the interface level reaches one of the two predetermined positions.

The operation of the column is as follows: To start up, the column is filled with the light liquid admitted through the pump 23 and inlet 24; the float 31 remains in its lower position, the rod 34 is in its upper position, the line 30 is vented, and the valve 28 remains fully closed. Heavy liquid is then admitted continuously through the pump 20 and inlet 21, displacing light liquid, which flows out through the outlet 25. Heavy liquid collects on the tray 14 and flows downward through the orifices 18 thereof as a multitude of small jets, being thereby dispersed in the continuous body of light liquid immediately beneath the tray; simultaneously, displaced light liquid ascends through the uppermost conduit 19. Flow through the orifices 18 and the conduit 19 is due to the difference in the hydrostatic head of the conduit 19, now functioning as a riser, and the layer of heavy liquid on the tray. The dispersed heavy liquid settles through the light liquid onto the second tray 13 to form a layer thereon, and is similarly dispersed through the orifices thereof downwards into the light liquid beneath the tray while light liquid ascends through the conduit 19 of the tray 13. This action is repeated on successive trays until a layer of heavy liquid accumulates at the bottom of the column. When this occurs there are, within each compartment a lower layer of heavy liquid and an upper layer of light liquid, separated by an interface, and the column is ready to begin normal operation.

During normal operation the light and heavy liquids are supplied at any desired flow rates, which may but need not be uniform, in any desired ratio corresponding to the ratio at which the liquids are to be contacted and at a pressure sufficient to overcome the back-pressure in the outlet 25. It will be appreciated that the maximum permissible flow rates, above which flooding occurs, are limited by the rate at which the liquids pass through the orifices under the available hydrostatic head at each plate. The operation, which is cyclic, will be described in four phases, it being assumed that the level of the top of each conduit 19 is the same as the level of the bottom of the conduit of the next higher plate.

In the first phase, which may follow the start-up period just described, conditions are as described for the end of the start-up period, i. e., the valve 28 is closed, the interface levels in all compartments are so low that both ends of all conduits 19 are immersed in light liquid, light liquid ascends through these conduits, which function as risers, and heavy liquid is dispersed through the orifices 18 of all plates as jets into the adjoining layers of light liquid immediately beneath the plates and settles from the resulting dispersions through the interface in each compartment into the layer of heavy liquid. Thus the heavy liquid flows more or less vertically while the light liquid flows horizontally across each tray because of the staggered arrangement of the conduits 19. Only light liquid is discharged through the outlet 25, with the result that the inventory of heavy liquid in the column is progressively increased; this brings about a rise in the interface levels. This rise is most pronounced in the lowermost compartment, from which no escape of heavy liquid occurs, and may during the first phase occur only in the lowermost compartment if the feed rate of heavy liquid is sufficiently low to permit each tray to pass off liquid at the same rate as the feed rate. The first phase ends when the interface in the lowermost compartment has risen to the bottom of the lowermost conduit 19.

Figures 2, 3, 4, 5:
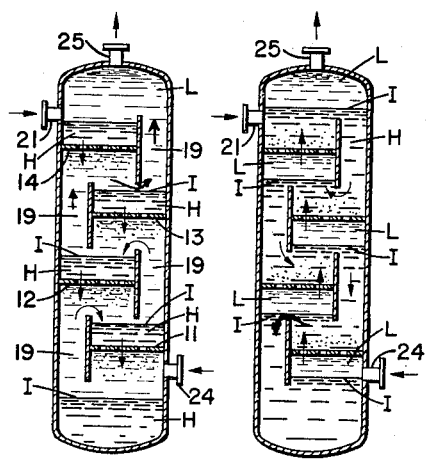
Figures 2, 3, 4 and 5 are diagrammatic views of the column illustrating successive stages in the cycle of operation.

This phase of the operation is illustrated in Figure 2, wherein the interface levels are designated by the letter I, the spaces occupied by the heavy liquid are designated H, and the spaces occupied by the light liquid are designated L; arrow directions indicate flows.

In the second phase, which starts when the bottom of the lowermost conduit 19 is immersed in heavy liquid, the latter is forced up into this conduit by displacement due to the continued influx of light liquid from the inlet 24. This increases the hydrostatic head in the conduit, and downward dispersion of heavy liquid stops when the conduit is filled with heavy liquid to about half its height, resulting in a rise in the interface in the second compartment, between the plates 11 and 12. When the conduit is further filled with heavy liquid the hydrostatic balance at the lowermost plate 11 is reversed and thereupon the light liquid flows upwards through the orifices 18 and is dispersed into the continuous layer of heavy liquid on the plate 11. When the interface in the second compartment has risen to the top of the lowermost conduit 19 heavy liquid flows downward through it; also, the bottom of the conduit of the second plate 12 is then immersed in heavy liquid, causing heavy liquid to be forced up therethrough. The action described above for the plate 11 is thereupon repeated at the plate 12, viz., the light liquid begins to be dispersed upwards through the orifices of the plate 12, the interface in the third compartment, above the plate 12, rises, and heavy liquid flows down through the conduit of plate 12. This action is repeated in succession on each plate toward the top, until light liquid is being dispersed through all of the plates into the respective layers of heavy liquid above the plates. The dispersed light liquid settles upwards from each dispersion to become a part of the supervening layer of light liquid, and the heavy liquid flows across each tray and flows through conduits 19 which now function as downcomers. This condition is shown in Figure 3.

During this phase of the operation the interface levels continue to rise, but under most operating conditions the rise is initially greatest at the bottom. Thus, when the flow reversal has occurred at the first plate 11, the downflow of heavy liquid through the lowermost conduit at first restricts the rate of rise of the interface in the second compartment, while that in the lowermost compartment continues to rise; but as the latter rises the hydrostatic head at the bottom of the lowermost conduit increases, whereby the downflow of heavy liquid becomes smaller, resulting in a more rapid rise in the interface within the second compartment. This action is also repeated on successive trays, so that all interface levels rise, resulting usually in a condition in which the depths of the layers of light liquid are progressively smaller toward the bottom of the column.

It may be noted that when the top of the conduit extending upwardly into a compartment is below the bottom of the conduit of the next higher plate the latter is immersed in heavy liquid somewhat later than the former, so that there will be a longer time interval between the flow reversals on successive trays. For this reason it is not desirable to leave much of a vertical gap between the ends of the conduits. On the other hand, when the upwardly extending conduit is slightly higher than the bottom of the conduit from the higher plate, producing a small overlap of not more than about one-tenth of the compartment height, a more rapid succession of flow reversals is attained. Too great an overlap is, however, preferably avoided because it may result in a flow reversal of a higher plate before this occurs on a lower plate; this condition, while not always objectionable, may lead to an undue rise in the interface level in one or more of the upper compartments before the interface in the lowermost compartment rises sufficiently to start the third phase of the operation.

The third phase begins when the interface in the lowermost compartment and the float 31 have risen sufficiently to cause the lever arm 32 to engage the abutment 37 and move the rod 34 and pistons 40—42 to their lower positions, as shown in Figure 1. This applies pressure gas from the line 45 to the line 30 and the bellows 29 to open the valve 28. The back pressure on the outlet 25 is sufficient in relation to that on the open outlet 27 to cause heavy liquid to flow out through the outlet 27 at a rate exceeding the admission rate through the inlet 21, thereby decreasing the inventory of heavy liquid in the column and causing a fall in the interface levels. A choice of operation is here possible. The back-pressure in the outlet 25 can be so high that discharge of light liquid now ceases, or a somewhat lower back-pressure can be used at which some light liquid escapes, but at a rate lower than that at which it is supplied through the inlet 24. In either choice, light liquid continues during this phase to be dispersed upwards through the orifices of the plates and heavy liquid continues to flow down through the conduits 19. This condition (assuming cessation of flow through outlet 25) is shown in Figure 4. This phase ends when the interface in one of the compartments, normally the uppermost compartment above the plate 14, has dropped to the top of the upwardly extending conduit.

In the fourth phase, assuming the uppermost compartment to be the first wherein the interface falls to the top of its conduit 19, light liquid is forced down through the said conduit by displacement due to the admission of heavy liquid at 21 when the top of that conduit is immersed in light liquid. This decreases the hydrostatic head in the conduit, first stopping further upward dispersal of light liquid, causing a fall in the interface within the compartment beneath plate 14, and, upon further filling of the conduit, bringing about a reversal of the hydrostatic head, which causes heavy liquid to be dispersed downwards through the orifices 18 of the plate 14. Light liquid flows up through the said conduit when the bottom thereof is immersed in light liquid upon a sufficient fall in the interface in the compartment beneath a plate 14. The top of the conduit of plate 13 is then also immersed in light liquid, and the flow reversal occurs on that plate. This action is repeated successively on the lower plates, the action being the reverse of that described above for the second phase; the observations made previously with regard to the changes in flow rates and the influence of the relative levels of the ends of the conduits are here applicable. When flow reversals have occurred on all plates heavy liquid is dispersed downwardly through all plates, the conduits 19 again function as risers, and the inventory of heavy liquid continues to decrease. This is illustrated in Figure 5. At the completion of this phase the depths of the light liquid layers are progressively greater toward the top of the column and the interface in the lowermost compartment is sufficiently low to cause the lever 32 to engage the abutment 36.

In the first phase of each succeeding cycle the rod 34 is raised by the lever 32, thereby shifting the pistons 40—42 and venting the bellows 29 through the line 30 and vent 43; this causes the valve 28 to close, thereby bringing the column back to the condition described above for the first cycle and shown in Figure 2.

In the foregoing operations the liquids flow through the vertical riser-downcomer conduits 19 only when the interface levels have been shifted to immerse the conduit ends in the respective liquids. This produces an automatic control of the interface levels, and corrects for any change in the relative volumes of the two liquids due to transfer of solute.

While one specific embodiment of the apparatus and method was described in detail, it is evident that these may be modified in various respects without departing from the spirit and scope of the invention. Thus, while the valve 28 was described as effecting a total shut-off of the heavy liquid discharge during the first two phases, it is possible to employ only a partial shut-off, sufficient to reduce the heavy liquid effluent to a rate smaller than the feed rate at 21. Similarly, the effluent control valve may be applied to the light liquid outlet 25 instead of to the heavy liquid outlet, or both outlets may be provided with valves, actuated by the same pneumatic valve 35 to move one toward open position when the other is moved toward closed position to effect either total or partial shut-off; this expedient obviates the need for operating under back-pressure. Moreover, the level-sensing device may be placed in a compartment other than the lowermost compartment, such as the uppermost compartment or an intermediate compartment.

Figure 6:
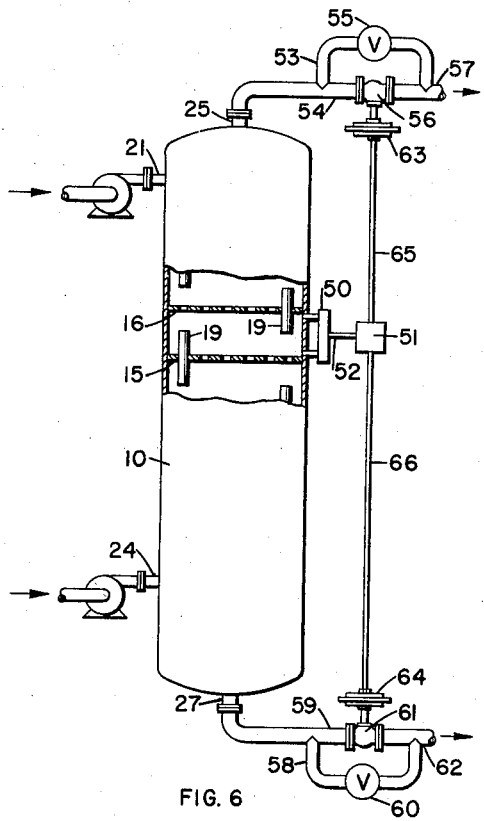
Figure 6 is a diagrammatic view showing a modified arrangement of the discharge control device.

These modifications are indicated diagrammatically in Figure 6 wherein the numbers 10, 19, 21, 24, 25 and 27 denote parts as described for Figure 1, the numbers 15 and 16 designating any pair of adjoining plates. The compartment between these plates is provided with any suitable level-sensing device, represented at 50, connected to a controller 51, such as a pneumatic valve, by a transmission line 52, which may be mechanical, electrical or a pressure line, as understood in the art. The outlet pipe 25 is connected to branches 53 and 54 having a manually operated throttling valve 55 and a powered shut-off valve 56, respectively, and leading to a common light-liquid discharge pipe 57. Similarly, the outlet pipe 27 is connected to branches 58 and 59 having a manually operated throttling valve 60 and a powered shut-off valve 61, respectively, and leading to a common heavy-liquid discharge pipe 62. The valves 56 and 61 are provided with actuators 63 and 64 controlled by the controller 51 through lines 65 and 66, respectively, in a manner that one of the valves is opened when the other is shut, and vice versa.

The controller 51 is adjusted to shut the valve 56 and to open the valve 61 when the interface level within the compartment between the plates 15 and 16, as sensed by the device 50, rises to a first predetermined level, above the bottom of the conduit 19 which passes through the upper plate 16, and to move the valves in the reverse directions when the said interface falls to a second predetermined level below the top of the conduit 19 which passes through the lower plate 15, there being an appreciable distance of preferably at least one-tenth the height of the compartment between these two levels. The valves 55 and 60 are adjusted manually to permit discharge of light and heavy liquids at rates smaller than the feed rates of the light and heavy liquid, respectively, through the inlets 24 and 21 when the valves 56 and 61 are respectively shut.

The operation of the embodiment according to Figure 6 is as was described previously with the differences that flow of liquids through one or both the outlets continues at all times through the branches 53 and/or 58, in accordance with the settings of the manually operable valves; and that the change in discharge rates is governed by the interface level in the intermediate compartment instead of in the lowermost compartment. It may be noted that, for given constant feed rates, the cycle of operation is lengthened by opening or shortened by throttling the manually operable valves. It is moreover, possible to vary the relative durations of parts of the cycle by means of these valves. Thus, if the valve 55 is closed or at least throttled more than the valve 60, the build-up of inventory of the heavy liquid in the column will take longer than the build-up of light liquid; hence the durations of the first two phases will be lengthened in relation to the third and fourth phases.

I claim as my invention:

1. In a reciprocal dispersion method of contacting wherein two at least partially immiscible liquids having different densities are flowed in countercurrent through a series of confined contacting stages situated at progressively different levels and a layer of each of said liquids separated from one another by an interface is maintained within each of said stages, the improvement comprising the steps of: recurrently changing the levels of said interfaces between vertically spaced levels; dispersing liquid of higher density from each stage into the layer of liquid of lower density in the respective adjacent lower stage and simultaneously flowing liquid of lower density from the latter stage to the former stage directly between intermediate levels of said stages when the interface levels are low; and dispersing liquid of lower density from each stage into the layer of liquid of higher density in the respective adjacent higher stage and simultaneously flowing liquid of higher density from the latter stage to the former stage directly between intermediate levels of said stages when the interface levels are high.

2. A reciprocal dispersion method of operating a countercurrent contacting apparatus which apparatus comprises a series of contacting compartments situated at progressively different levels and separated from one another by intervening partitions each of which provides a multitude of small passages adapted for the transfer of said liquids alternately in opposite directions as jets between closely adjacent levels within adjacent compartments which are situated on opposite sides of the partition and a riser-downcomer conduit providing free and direct communication between points at intermediate levels within said adjacent compartments, said method including the steps of: flowing a first liquid from a lower compartment through the other compartments and flowing a second liquid having a higher density than and being at least partially immiscible with said first liquid from an upper compartment through the other compartments;

maintaining within each of said compartments a layer of each of said liquids separated from one another by an interface; recurrently changing said interfaces between vertically spaced levels so as to immerse both ends of said conduits alternately in the first liquid and in the second liquid; dispersing second liquid from each compartment into the layer of first liquid within the respective adjacent lower compartment through the said passages of the intervening partition and flowing first liquid up through the conduit of the said partition when both ends of said conduit are immersed in first liquid; and dispersing said first liquid from each compartment into the layer of second liquid within the respective adjacent higher compartment through the said passages of the intervening partition and flowing second liquid down through the conduit of the said partition when both ends of said conduit are immersed in second liquid.

3. A reciprocal dispersion method of contacting two at least partially immiscible liquids having different densities in a countercurrent contacting apparatus which apparatus includes a series of contacting compartments situated at progressively different levels and separated from one another by partitions each of which provides a multitude of small passages adapted for the transfer of said liquids alternately in opposite directions as jets between closely adjacent levels within adjacent compartments which are situated on opposite sides of the partition and a riser-downcomer conduit providing free and direct communication between points at intermediate levels within said adjacent compartments, said method including the steps of: continuously admitting the liquid of lower density to the lowermost compartment and the liquid of higher density to the uppermost compartment; maintaining within each of said compartments a layer of each of said liquids separated from one another by an interface; discharging liquid of lower density from the uppermost compartment and liquid of higher density from the lowermost compartment; and alternately (a) flowing liquid of higher density from the layer thereof in each compartment above the lowermost through said small flow passages and dispersing said liquid within the layers of the liquid of lower density in the adjacent lower compartments, and (b) flowing liquid of lower density of the layer thereof in each compartment below the uppermost compartment through the same small flow passages and dispersing said liquid within the layers of liquid of higher density in the adjacent higher compartments by alternately (a) reducing the discharge rate of one of said liquids and reducing the inventory of said liquid in the compartments to shift said interfaces away from the settling direction of said one liquid and (b) increasing the discharge rate of said one liquid and increasing the inventory of said liquid in the compartments to shift in said interfaces in the opposite direction.

4. Method according to claim 3 wherein said discharge rate of said one liquid is reduced to zero while the inventory of said liquid is being increased.

5. Method according to claim 4 wherein the discharge rate of the other liquid is reduced to zero while the inventory of said one liquid is being reduced.

6. Method according to claim 3 wherein some discharge of both said liquids occurs at all times but the rates of discharge thereof are varied so that the discharge rate of one liquid is increased when the discharge rate of the other is decreased.

7. A reciprocal dispersion method of contacting two at least partially immiscible liquids having different densities in a countercurrent contacting apparatus which apparatus includes a series of contacting compartments situated at progressively different levels and separated from one another by partitions each of which provides a multitude of small flow passages adapted for the transfer of said liquids alternately in opposite directions as jets between closely adjacent levels within adjacent compartments which are situated on opposite sides of the partition and a riser-downcomer conduit providing free and direct communication between points at intermediate levels within said adjacent compartments, said method including the steps of: continuously admitting the liquid of lower density to the lowermost compartment and the liquid of higher density to the uppermost compartment at constant rates; maintaining within each of said compartments a layer of each of said liquids separated from one another by an interface; discharging liquid of lower density from the uppermost compartment and liquid of higher density from the lowermost compartment at varying rates such that the discharge rate of one liquid increases when the discharge rate of the other decreases, thereby alternately (a) decreasing the inventory of one liquid in the compartments while increasing the inventory of the other and shifting the interfaces in the settling direction of said one liquid and (b) increasing the inventory of said one liquid while decreasing the inventory of said other liquid and shifting said interfaces in the opposite direction; flowing liquid of higher density from the layer thereof in each compartment above the lowermost through said small flow passages and dispersing said liquid into the layer of liquid of lower density within the respective adjacent lower compartment while flowing liquid of lower density up through said conduits when the interface levels in said compartments are low; and flowing liquid of lower density from the layer thereof in each compartment below the uppermost through the same small flow passages and dispersing said liquid into the layer of liquid of higher density in the respective adjacent higher compartment while flowing liquid of higher density down through said conduits when the interface levels in said compartments are high.

8. Reciprocal dispersion countercurrent contacting apparatus comprising: a series of enclosed contacting chambers at progressively different levels, each chamber being adapted to contain layers of two liquids separated from one another by an interface; dispersing means between each pair of adjacent chambers providing a multitude of small flow passages adapted for the flow of each of said liquids alternately in different directions between closely adjacent levels in the adjacent chambers into the other liquid; a riser-downcomer conduit interconnecting each said pair of adjacent chambers at intermediate levels therein displaced vertically from the partitions beyond said closely adjacent levels; inlet means for continuously admitting liquids of higher and lower densities respectively to a higher and a lower chamber; outlets for discharging liquids of higher and lower densities respectively from a lower and a higher chamber; flow-control means for at least one of said outlets; and means for recurrently moving said flow-control means to increase and decrease the flow of liquid discharged therethrough, said last-named means including means for decreasing the flow of said liquid after the interface in said compartments reach a height displaced from said intermediate levels in the settling direction of said liquid and for increasing the flow of said liquid after the said interfaces reach heights displaced from said intermediate levels in the opposite direction, thereby recurrently changing the inventory of said liquid in said compartments.

9. Apparatus according to claim 8 wherein the riser-downcomer conduits connecting each intermediate chamber to the adjacent higher and lower chamber communicate with the said intermediate stage at substantially the same level.

10. Reciprocal dispersion countercurrent contacting apparatus wherein two at least partially immiscible liquids having different densities are dispersed alternately one into the other within each of a plurality of compartments which includes: a vertically elongated tank containing a plurality of partitions subdividing the tank into a series of contacting compartments situated at progressively different levels, each said compartment being adapted to contain a layer of each of said liquids separated from one another by an interface, each partition having a plurality of small passages for the flow of each of said liquids alternately in opposite directions between closely adjacent levels within adjacent compartments on opposite sides of the partition as a multitude of jets which enter the other liquid and a riser-downcomer conduit opening into said adjacent compartments at intermediate levels therein displaced vertically from the partitions beyond said closely adjacent levels; inlet means for continuously admitting the liquid of higher density to the uppermost compartment and the liquid of lower density to the lowermost compartment; an outlet for discharging the liquid of higher density from the lowermost compartment; an outlet for discharging the liquid of lower density from the uppermost compartment; and means for controlling the flow through said outlets to vary the levels of the interfaces so that the opening in each riser-downcomer conduit is alternately immersed in one liquid and in the other liquid, said means including: a valve in the outlet for at least one of said liquids; level-sensing means disposed to sense the level of the interface within at least one of said compartments; and actuating means interconnected between said level-sensing means and said valve for moving said valve toward open position after said last-mentioned interface reaches a first predetermined level at which the opening of a riser-downcomer conduit in said compartment is immersed in the liquid which flows through the valve, thereby shifting said interfaces in the settling direction of said one liquid, and for moving said valve toward closed position after the interface reaches a second predetermined level at which said opening is immersed in the other liquid, thereby shifting said interfaces in a direction opposite to said settling direction.

11. Apparatus according to claim 10 wherein the said second predetermined level is displaced from the first predetermined level by a distance exceeding one-tenth the height of said compartment which is provided with the level-sensing means.

12. Reciprocal dispersion countercurrent contacting apparatus wherein two at least partially immiscible liquids having different densities are dispersed alternately one into the other within a plurality of compartments which includes: a vertical tank having a plurality of transverse perforated plates subdividing the tank into a series of compartments each of which is adapted to contain a layer of each of said liquids separated from one another by an interface; a riser-downcomer conduit extending through each said plate and above and below the same opening into the adjacent compartments on opposite sides of the plate at intermediate levels therein displaced vertically from the plates; inlet means for continuously admitting the liquids of higher and lower densities respectively to upper and lower parts of the tank; outlets for discharging the liquids of higher and lower densities respectively from lower and upper parts of the tank; and means for controlling the flow through said outlets to vary the levels of the interfaces so that the opening in each riser-downcomer conduit is alternately immersed in one liquid and in the other liquid, said means including: flow-control means for at least one of said outlets; level-sensing means disposed to sense the level of the interface within at least one of said compartments; and actuating means interconnected between said level-sensing means and said flow-control means for moving said flow-control means to increase the rate of discharge of the liquid flowing therethrough after the interface sensed by said level-sensing means reaches a first predetermined level at which the end of a riser-downcomer conduit is immersed in the last-mentioned liquid to shift said interfaces in the settling direction of said liquid, and for moving said flow-control means to decrease the rate of discharge after the said sensed interface reaches a second predetermined level at which said end of the conduit is immersed in the other liquid to shift said interfaces in the opposite direction.

References Cited in the file of this patent

UNITED STATES PATENTS

| | | |
|---|---|---|
| 2,121,324 | Manley | June 21, 1938 |
| 2,647,856 | Grunewald et al. | Aug. 4, 1953 |